United States Patent [19]

Day

[11] Patent Number: 5,678,511
[45] Date of Patent: Oct. 21, 1997

[54] BATHING DEVICE FOR PETS

[76] Inventor: Robert L. Day, 42 Alberta Dr., Westbrook, Me. 04092

[21] Appl. No.: 682,400

[22] Filed: Jul. 17, 1996

[51] Int. Cl.$^6$ .............................. A01K 13/00; A61D 11/00
[52] U.S. Cl. ................................... 119/676; 119/671
[58] Field of Search ...................... 119/676, 673, 119/671, 674, 678, 751, 753, 755

[56] References Cited

U.S. PATENT DOCUMENTS

| | | | |
|---|---|---|---|
| 2,438,979 | 4/1948 | Short | 119/676 X |
| 3,130,709 | 4/1964 | Rothberg | 119/755 |
| 4,020,796 | 5/1977 | Grifa | 119/671 |
| 4,057,032 | 11/1977 | Dimitriadis | 119/671 |
| 5,193,487 | 3/1993 | Vogel | 119/671 |
| 5,243,931 | 9/1993 | McDonough | 119/671 |
| 5,259,339 | 11/1993 | McLaughlin | 119/676 |

*Primary Examiner*—Robert P. Swiatek
*Assistant Examiner*—Yvonne R. Abbott
*Attorney, Agent, or Firm*—Chris A. Caseiro; Thomas L. Bohan

[57] ABSTRACT

An animal-containment device that enables quick and easy containment, such as bathing, of a household pet. The device includes a basin that may be easily manufactured in a unitary piece. The basin includes at least one adjustable strap attached between the sides of the basin. The strap is secured in elongated slots along the sides of the basin over the back of the pet being bathed. A central hump is formed on the basin floor that conforms substantially to the underbelly of the pet. The hump prevents the pet from sitting down during the bathing process. An adjustable collar restraint strap is attached to an additional slot. The collar restraint strap is attachable to a standard pet collar. The pet is immobilized by way of the hump and adjustable straps. A drain with a removable plug is included at the bottom of the basin that is attachable to a standard garden hose for removal of bath water. Assorted bathing accessories are also included for attachment around the lip of the basin.

18 Claims, 4 Drawing Sheets

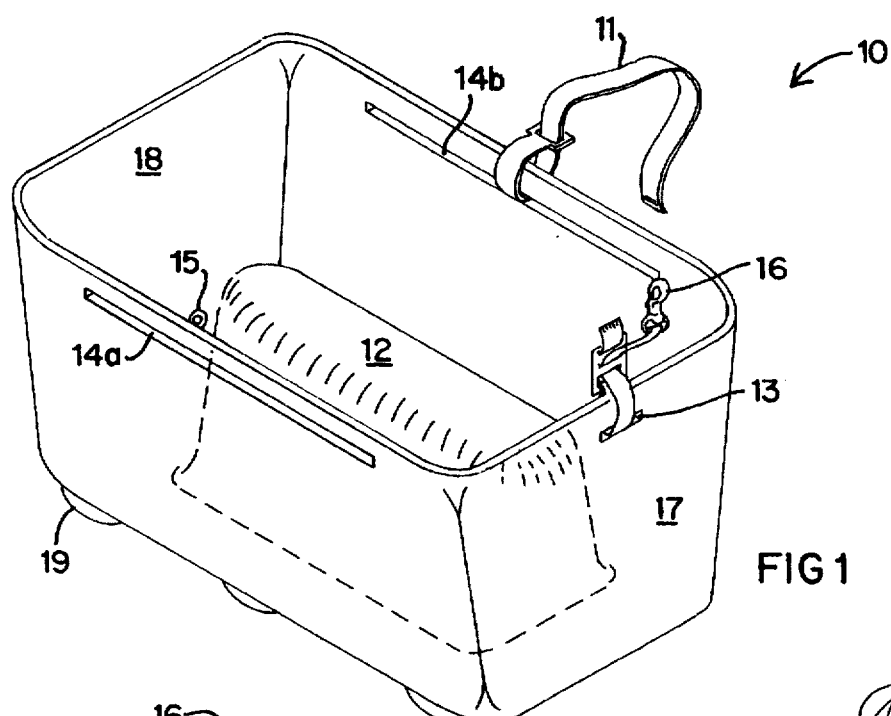
FIG 1
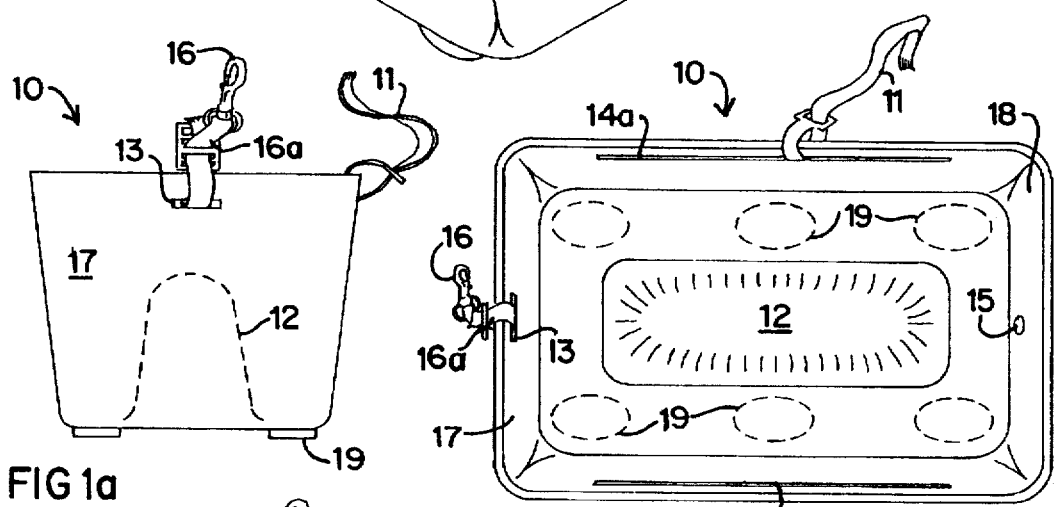
FIG 1a
FIG 1b
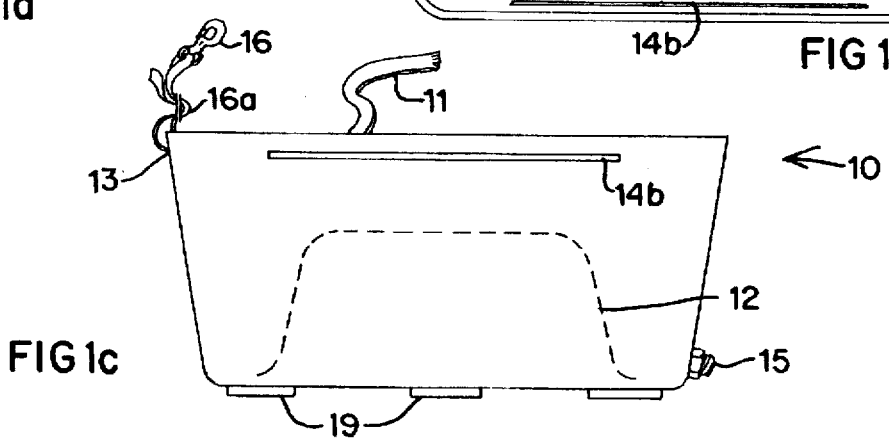
FIG 1c

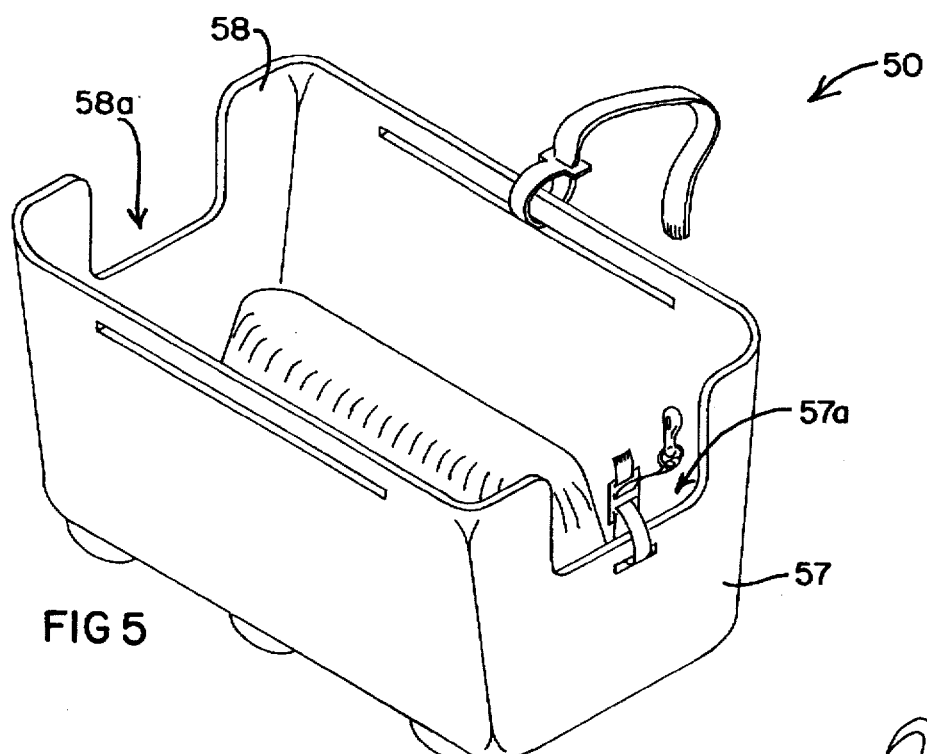
FIG 5
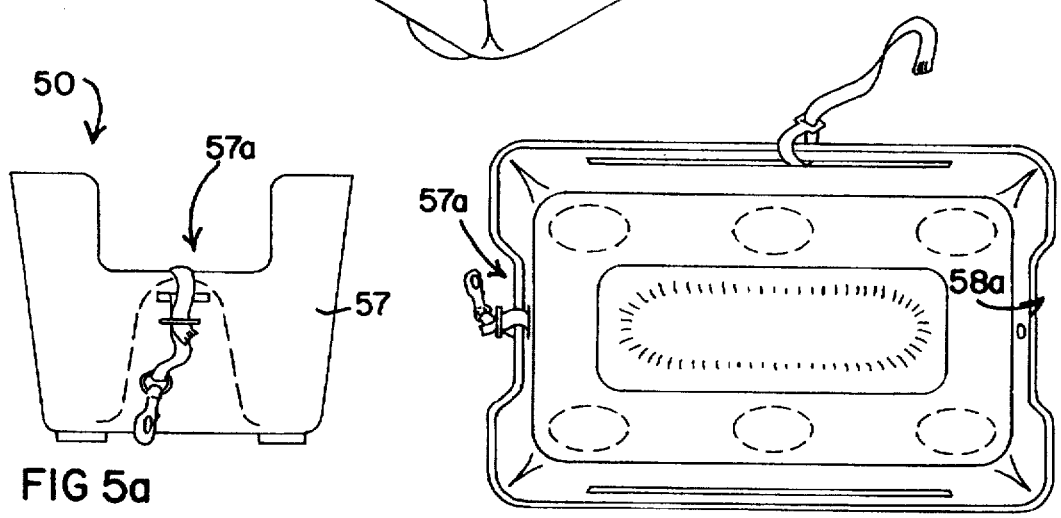
FIG 5a
FIG 5b
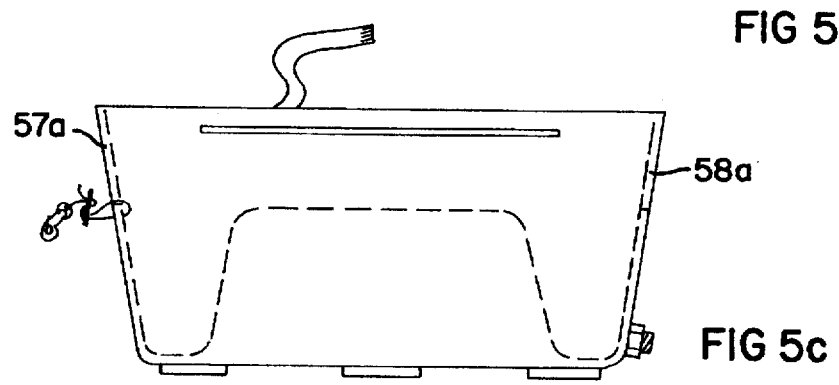
FIG 5c

BATHING DEVICE FOR PETS

BACKGROUND OF THE INVENTION

1. Field of Invention

The present invention relates to the field of pet care. More particularly, the present invention relates to a device for providing an efficient means of bathing pet animals. More particular yet, the present invention involves a tub for bathing pet animals, where the tub contains form-fit features to force a four-legged pet animal to stand while in the tub.

2. Description of Prior Art

Domesticated animal ownership, especially of pet dogs, continues to grow throughout the world. Concurrently, the amount of time that individual pet owners have for the care of their pets has decreased. Numerous socio-economic factors (e.g., increased cost-of-living requiring more work and leaving less free time) have contributed to this decrease in the amount of time available to individuals for pet-care. Accordingly, pet owners have turned to kennels, animal-trainers, veterinarians, and others in the pet-care industry to provide the needed grooming, and more specifically bathing, for their pets. Such pet-care, however, comes with significant associated costs. Because periodic professional grooming of pets primarily consists of bathing the pet, one way for pet owners to reduce such costs is to bathe their own pets.

In the field of bathing devices, there have been attempts to facilitate bathing of animals. In general, the complexity of such efforts has undercut whatever advantages they might otherwise offer. Indeed, the time and effort involved in using complex and inefficient bathing devices is self-defeating. Pet owners who prefer not to bathe their pets in the same tub or shower in which they or their family members bathe are limited to options that have various undesirable features. They may hose down the pets outdoors, but this is not a year-round option in the colder regions of the world. They may use a washtub of the well-known cylindrical galvanized steel design. However, since such washtubs are drained of bath-water by being tipped, their use particularly onerous for non-muscular pet owners. Other prior-art bathing devices have their own disadvantages.

One prior-art animal-bathing device is that of Rogers (U.S. Pat. No. 3,793,987), and involves substantially automated bathing of a domesticated animal. It includes a main portion similar to that of a portable dishwasher, having a water inlet hose for attachment to a household faucet and a waste-water outlet hose for attachment to a toilet. A pet is placed within the main portion, and internal water jets, an air dryer, and restraints are utilized to sequentially wash, rinse, and dry the pet. The complex arrangement of Rogers is subject to unreliability due to the co-existence of electrical controls and numerous moving parts with corrosive water/soap solutions.

Other such self-contained pet-washers exist that are deficient for the same reasons as is the Rogers device. A general defect of prior-art automated pet-washers is the intolerance that most animals, be they household pets or undomesticated farm animals, have for a noisy, cramped, wet, and hot (if a dryer is included) environment. Such a stressful environment can be actually unhealthy for the animal being bathed. Perhaps because of this and the other mentioned defects, use of these automated pet-washer systems has not become widespread in the pet-care industry. The care and gentleness with which household pets are normally showered are inconsistent with the automated-process-pet-washers.

Concurrent with the development of the prior-art pet-washers described above, other simpler animal-bathing devices have been developed with the goal of increasing pet-bathing efficiency. Typically, such simplified prior-art animal-bathing devices incorporate a basin within which a pet may be quickly and easily placed, and which utilize manual bathing of the pet. Three representative prior-art devices are those of Vogel (U.S. Pat. No. 5,193,487), McDonough (U.S. Pat. No. 5,243,931), and Farrell et al. (U.S. Pat. No. 5,269,260).

Vogel includes a rectangular, flat-bottomed basin with a lowered side to allow a pet to easily enter and retreat from the basin, respectively, before and after bathing. The basin also has a drain nozzle and fasteners along lateral edges. The drain is used with a hose to remove waste-water from the basin. The fasteners are used after the pet is bathed so as to hold a towel over the pet in order to prevent it from shaking off water outside the bathing device. Vogel also includes a single tether placed on the side of the basin near the pet's head. The tether is attached to the pet's collar so as to restrain movement of the pet during the bathing process. Vogel exhibits several flaws, including, most importantly, a lack of sufficient restraint of the pet during the bathing process. Even though the tether is a hindrance, the pet is not prevented from jumping out of the basin while remaining attached to it. Also, obstinate pets can be expected to seat themselves on the bottom of such basins, refusing to stand upright. This militates against the complete pet access needed for efficient bathing.

McDonough includes a basin similar to Vogel but one having a rigid and transparent top enclosure. The basin of McDonough also includes portals in the sides of the basin to provide access for the bather's arm. This allows the device to remain substantially sealed from splashing during the bathing process. Retention straps used around the pet's back and stomach are also included to inhibit pet movement within the basin. The straps are attached to the inner sides of the basin. While the device of McDonough prevents a pet from jumping out of the basin during bathing, the bathing process itself is inhibited by cumbersome portals and the visibility limitations caused by soapy water that may cover the inside surface of the enclosure. Further, McDonough does not overcome the deficiencies related to obstinate pets that refuse to stand during the bathing process and thus cannot be adequately bathed.

Farrell et al. includes a basin with a drain. The basin also has a slit in each side. Straps are fixed to each slit and a collar attached between the straps. The collar is centered in the basin and is designed to be used around the neck of the pet being bathed. Farrell et al. does not prevent a pet from removing its hindquarters from the basin. As well, Farrell et al. suffers from the deficiency seen throughout the prior-art concerning a lack of means to keep the pet standing during the bathing process.

Accordingly, the prior art fails to provide any animal-bathing device that prevent the animal from jumping out during the bathing process, while also ensuring that the pet remained standing during the bathing process. Therefore, what is needed is an animal-bathing device that provides quick and easy bathing of a pet while keeping the pet substantially immobile. What is also needed is such a device that provides a simple and safe manner of use, thereby providing reduced stress on the pet and elimination of risk of injury to the pet. Further, what is needed is such a device that ensures that animals will remain standing and thus provide the bather full access to the surfaces to be washed.

SUMMARY OF THE INVENTION

It is an object of the present invention to provide an animal-bathing device that eliminates the opportunity for a pet to jump out during the bathing process. Another object of the present invention is to ensure that the animal-being-bathed will remain standing and substantially immobile, and thus provide the bather full access to the surfaces to be washed. Yet another object of the present invention is to provide an animal-bathing device having few parts, thereby providing a simple and safe manner of use with reduced stress and risk of injury to the pet. Still another object of the present invention is to provide a stackable animal-bathing device, one amenable to low-cost manufacturing. It is also an object of the present invention to provide such a bathing device that may be used in any conventional tub or shower.

The animal-bathing device of the present invention includes a unitary basin designed for containment of an animal. The basin is formed with a hump and at least two adjustable straps. Although, this discussion focuses on use of the present invention in combination with a pet dog, any similar four-legged animal may be the subject of this device. Also, for purposes of illustration, the present invention is discussed in terms of animal bathing; however, it should be understood that the manner of use is not intended to be limited to bathing processes. The invention may be utilized in a variety of ways including, but not limited to, animal containment during bathing, drying, administration of flea powders and medicines, and veterinarian procedures.

A dog is placed within the basin such that the hump is located directly below its underbelly. It should be noted that dogs of various breeds, and thus varied shapes and sizes, may be accommodated by varying the size of the basin and related hump, all without straying from the intended scope of the invention. The novel aspect of the present invention is the quick and easy immobilization of a dog that it permits.

The animal-bathing device of the present invention is manufactured efficiently as a single-piece basin with but few separate parts. The material used may be plastic or metal and may be press-stamped or molded; however, any suitable materials and methods of manufacture may be used that provide quick, inexpensive fabrication of the basin. Besides the basin proper, the device includes a drain and plug at the base of the basin. The drain may be integrally formed with the basin or may be attached as a separate fitting affixed through the basin wall and including a hose fitting attachable to a standard garden hose. A plug is also included that is selectively placed in the drain so as to control flow of bath-water through the drain. Alternatively, the plug may be fashioned as a valve; however, the intended scope of the invention requires only that the drain be made to be selectively opened and closed.

The animal-bathing device according to the present invention also includes straps. One collar-retaining strap is located at an end of the basin near the head of the dog. The collar-retaining strap is an adjustable loop that winds through a slot in the basin and includes a spring-loaded clasp. The clasp is attachable to any standard collar commonly found on dogs and household pets. Another adjustable strap is placed over the dog's back. This back-strap is attached to the basin at longitudinal slots in the lateral sides of the basin. The back-strap is secured by an easily opened and closed means such as Velcro (TM) or snaps; however, any quickly removable fastening means may be used without straying from the intended scope of the present invention.

The back-strap is adjustable in two directions. The back-strap may be lengthened or shortened by the device user according to the height of the particular dog being bathed. As well, the back-strap is horizontally adjustable within the longitudinal slots by sliding it along the slots. This allows for accommodation of dogs of differing lengths. A range of sizes in the device is also provided so that small, medium, and large models of the animal-bathing device according to the present invention may be produced. Each of the small, medium, and large models are suitable for a range of pet sizes so that all breeds and sizes of dogs or other animals may be accommodated by the present invention.

The elements of the present invention that include the hump, collar-restraint strap, and back-strap act together to immobilize the dog during the bathing process. Such operation permits unfettered bathing of one's dog and thus reduces the time necessary for complete bathing. Control of the dog is maintained at all times. The hump-and-straps arrangement substantially eliminates the dog's ability to shake off soapy bath-water during the bathing process. Further, the simplified construction of the animal-bathing device according to the present invention results in low construction costs of a device that is portable and lightweight. The invention is thus usable both indoors and outdoors and may be easily stored by the consumer or stacked for shipment or display by wholesalers and retailers. Moreover, it may be fabricated with stand-off footings on the underlying basin surface so as to prevent complete surface contact of that underlying surface with the interior of a tub, shower, or even ground. In that way, the device will not scratch the substrate on which it rests. In addition, complete drainage of the basin may be achieved. Through the use of such attributes, the present invention may be used in virtually any location, including, but not limited to any residential tub.

It is to be understood that other objects and advantages of the present invention will be made apparent by the following description of the drawings according to the present invention. While a preferred embodiment is disclosed, this is not intended to be limiting. Rather, the general principles set forth herein are considered to be merely illustrative of the scope of the present invention and it is to be further understood that numerous changes may be made without straying from the scope of the present invention.

BRIEF DESCRIPTION OF THE DRAWINGS

FIG. 1 is a perspective view of an animal-bathing device in accordance with a first preferred embodiment of the present invention showing a basin with a collar-retaining strap and adjustable back-strap.

FIGS. 1a through 1c are end, top, and side views, respectively, of the animal-bathing device as shown in FIG. 1.

FIG. 5 is a perspective view of an animal-bathing device in accordance with a second preferred embodiment of the present invention, showing a basin with a collar-retaining strap and adjustable back-strap, where the basin includes lowered end-walls to facilitate an animal's entry and exit from the basin before and after the bathing process.

FIGS. 5a through 5c are end, top, and side views, respectively, of the second embodiment of the animal-bathing device as shown in FIG. 5 according to the present invention.

DETAILED DESCRIPTION OF THE PREFERRED EMBODIMENTS

Figure 2A:
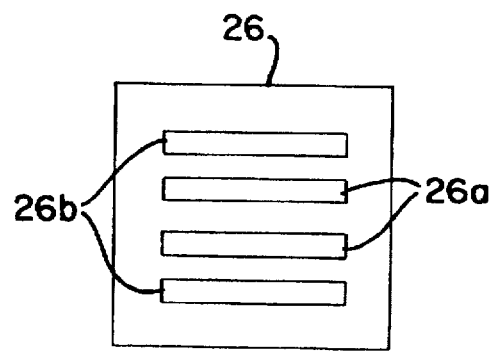
FIG. 2a is a frontal view of an adjustment clip of the collar-retaining strap as shown in FIG. 2.

In FIG. 1, an animal-bathing device 10 is shown according to a first preferred embodiment of the present invention. Bathing device 10 is a one-piece basin that includes a hump 12 centered in the bathing device 10, an adjustable back-strap 11, a collar-retaining clasp 16 located at a device front end 17, and a drain 15 located at a device back end 18. Supports 19 are provided on the underside of bathing device 10. These supports 19 are optional and the underside of bathing device 10 may be smooth. If the supports 19 are included, the device 10 may easily be used in a standard tub or shower enclosure. The supports 19 would prevent scratching and would ensure complete drainage of the basin. The hump 12 is hollow so that an opening is formed on the underside of bathing device 10. In the first preferred embodiment shown, both supports 19 and hump 12 are included; these facilitate piloted stacking of one bathing device 10 upon another.

Bathing device 10 is preferably molded from a durable, lightweight, non-corrosive plastic; however, any suitable method of manufacture (e.g., injection molding, stamping, machining) may be used to manufacture it. As well, any suitable material (e.g., high-impact plastic, stainless steel) may be utilized that will provide the necessary durable, water-proof, lightweight, and non-corrosive qualities. Bathing device 10 includes lateral slots 14a and 14b through which the back-strap 11 is wrapped. While only one back-strap is shown in slot 14b, it should be understood that more than one such strap may be included so that a half-length may be placed in slot 14a and the other half-length may be placed in slot 14b.

Back-strap 11 shown in FIGS. 1, 1a, 1b, 1c, and 1d is preferably made from one piece. While the preferred material for the back-strap is nylon, any material may be used so long as it provides the required durability after much exposure to soap and water, flexibility, and strength. Further, the back-strap 11 should be of a length sufficient to attach to bathing device 10 in slot 14b, reach over the back of the animal and across bathing device 10, wind through slot 14a, and be secured adjustably. Such adjustable securement is accomplished preferably by providing back-strap 11 with an area of Velcro (™) attached to opposing portions of the nylon material of back-strap 11. Alternatives to the use of Velcro (™) may be hooks, snaps, or buttons with the primary requirement that the adjustable securement be easily and quickly attached and detached to provide variation in the length of back-strap 11 that reaches across bathing device 10.

Figure 1D:
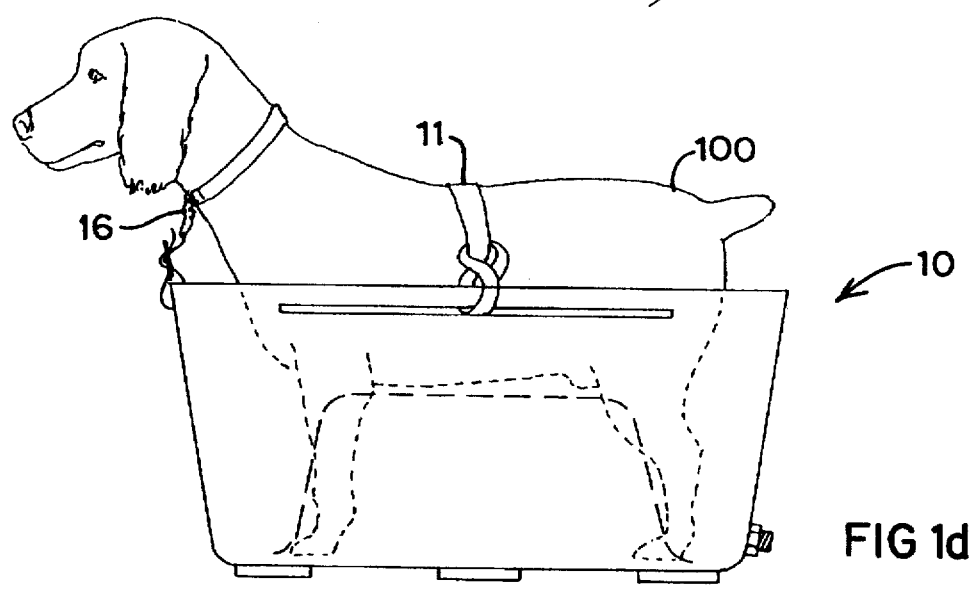
FIG. 1d is a perspective view of a pet within the animal-bathing device as shown in FIG. 1.

With continued reference to FIGS. 1, 1a, 1b, and 1c, it can be noted that hump 12 is centrally located in bathing device 10. Such location provides a relative form-fit of bathing device 10 to the underbelly of a pet (shown as 100 in FIG. 1d) that is placed in bathing device 10 during the bathing process. The hump 12 is integral with bathing device 10 and is sized so that enough space is left for animal legs and accumulated bath-water between inner walls of bathing device 10 and the hump 12. Collar-retaining clasp 16 is shown to be of a common spring-loaded type. Clasp 16 is designed to be attachable to all standard types of pet collars. In FIG. 1c, there is a collar-retaining strap 16a that attaches clasp 16 to bathing device 10 via end-slot 13. During the bathing process, hump 12, back-strap 11, and collar-retaining clasp 16 work together to immobilize the pet within bathing device 10. Strap 16a and clasp 16 are described in more detail by way of FIGS. 2 and 2a.

Figure 2:
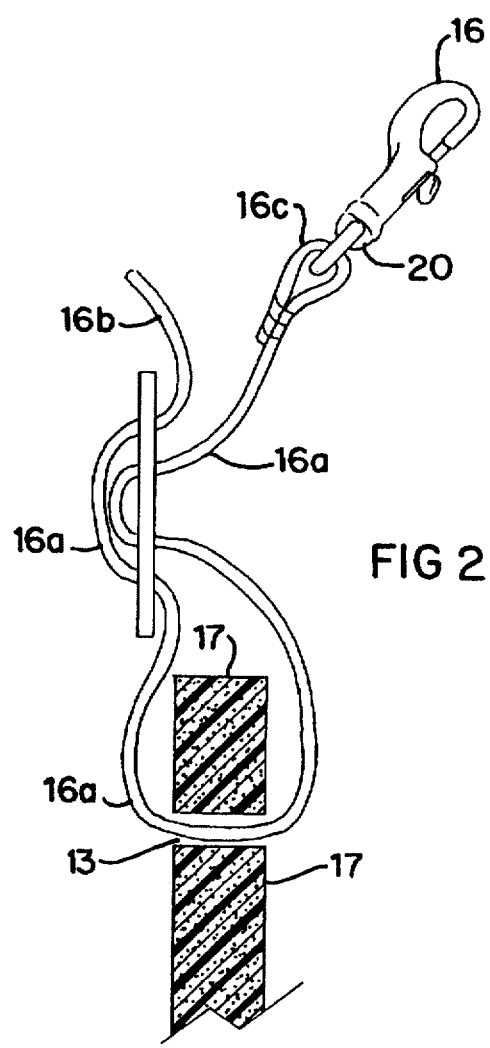
FIG. 2 is a cut-away partial side view of the collar-retaining strap as shown in FIG. 1.

FIG. 2 is a cut-away side view of device front end 17 that shows collar-retaining clasp 16 connected to collar-retaining strap 16a via swivel 20. Adjustment clip 26 provides inner clip slots 26a and outer clip slots 26b as shown in FIG. 2a. Collar-retaining strap 16a is attached to clasp 16 via swivel 20 at one end 16c, wound through clip slots 26a of adjustment clip 26, passing through end-slot 13 within device front end 17, and wound back through outer clip slots 26b. Varying the distance of clasp 16 from device front end 17 is accomplished by adjusting the length of the collar-retaining strap 16a. Such adjustment is actuated by manually pulling on strap end 16b and working strap 16a through its looping path until a satisfactory length is acquired. Such adjustment allows clasp 16 to be attached to the pet collar on pets of substantially all heights.

Figure 3:
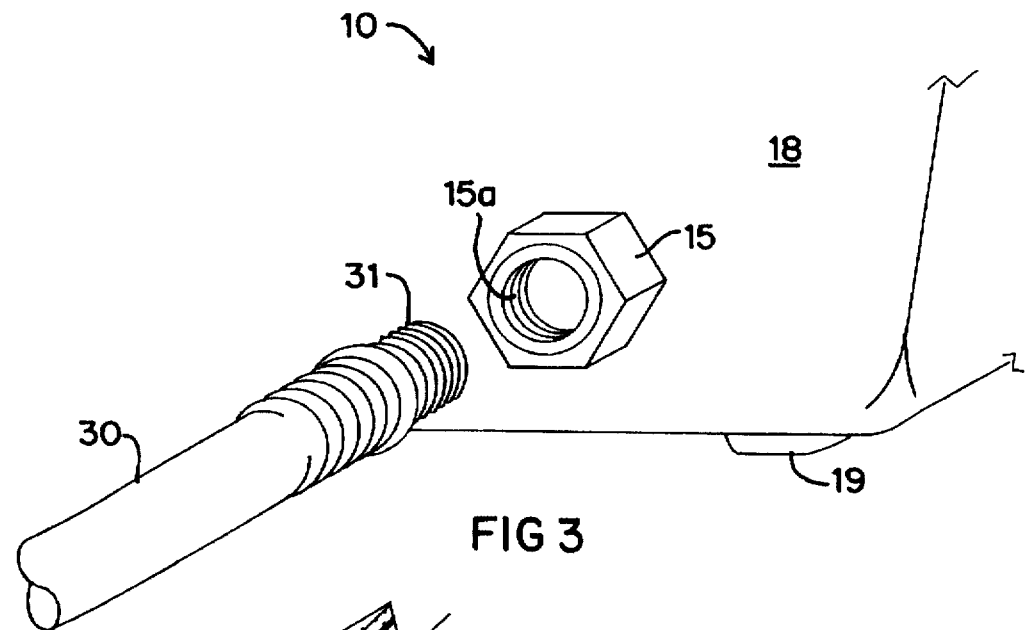
FIG. 3 is a close-up perspective view of a drain located in the basin as shown in FIG. 1 accompanied by a standard garden hose.

FIG. 3 is a close-up view of device back end 18 from outside bathing device 10. Drain 15 includes outer threads 15a. A standard garden hose 30 is shown near drain 15 to illustrate the manner by which the bathing device 10 is emptied of dirty bath water. Hose 30 typically includes a threaded hose end 31. Outer threads 15a of drain 15 are made so that a water-tight connection may be made between threaded hose end 31 and inner threads 15a. This point of connection is shown in a cut-away view in FIG. 3a.

Figure 3A:
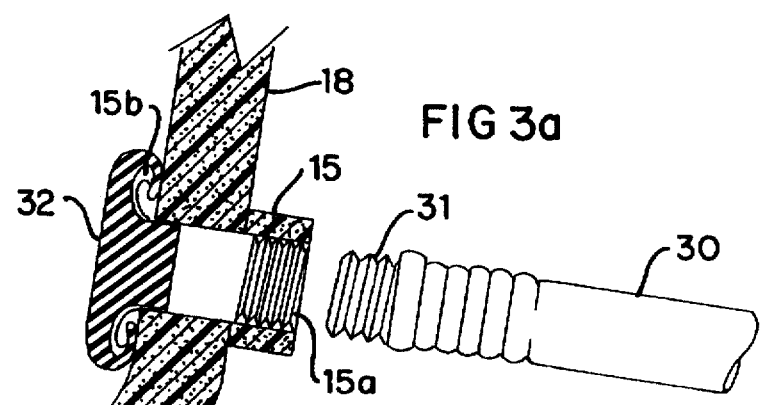
FIG. 3a is a cut-away partial side view of the drain located in the basin as shown in FIG. 3 accompanied by a standard garden hose.

FIG. 3a shows drain 15 passing through the wall of device back end 18. As shown, when hose 30 is not connected to drain 15, a drain plug 32 is snap-fit into place on the inner side of drain 15. While one particular design of drain plug 32 is shown, it should be noted that any type of plugs may be utilized (e.g., valve with external spigot, screw-type plug, sliding valve). In the preferred embodiment shown, drain 15 is manufactured separately of a durable metal and held in place by a crimped edge 15b. Again, while drain 15 is shown to be metallic and crimped into place, any material may be used in any manner without straying from the intended scope of the present invention. For instance, drain 15 may also be formed integrally of plastic with device back end 18 during injection molding of bathing device 10.

Figure 4:
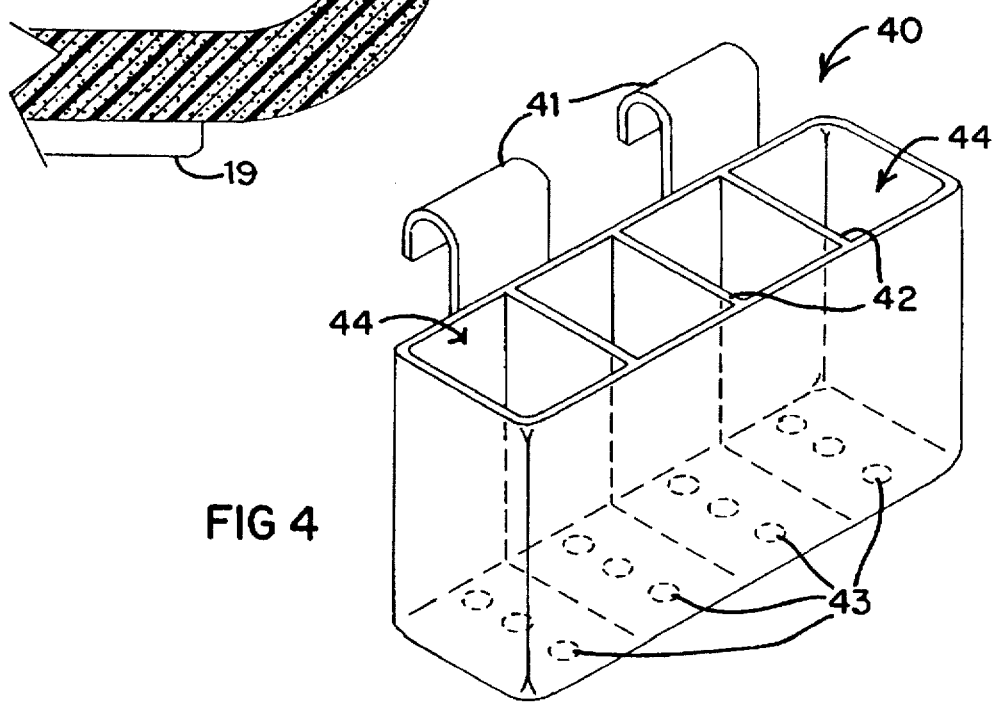
FIG. 4 is a perspective view of one type of accessory for use in combination with the animal-bathing device as shown in FIG. 1.

Additionally, various accessories may be advantageously combined with the bathing device 10 according to the present invention. FIG. 4 shows a shampoo caddy 40 that may be used to hold bottles of shampoo, pet dipping solutions, or combs and brushes within compartments 44. Partitions 42 maintain any items in the separate compartments 44. Hooks 41 are attached to the caddy 40 so that the caddy 40 may be mounted to any top edge of bathing device 10. Drainage holes 43 are provided so that water splashed during the bathing process will not accumulate in the caddy 40. While caddy 40 is shown, it should be understood that any other accessory may be formed having hooks 41 that may be mounted to any top edge of bathing device 10 without departing from the scope of the present invention.

A second preferred embodiment of the present invention is shown in FIGS. 5, 5a, 5b, and 5c. The second embodiment differs from the first preferred embodiment only in that device front end 57 and device back end 58, respectively, include lowered portions 57a and 58a. The alternative bathing device 50 allows a pet (not shown) to be walked into and out of the basin of the bathing device 50. This is useful in instances where: 1) a pet does not tolerate being lifted; 2) a pet is too large to be safely lifted; 3) a pet's owner is not physically able to lift the pet; or some combination thereof. The shape of alternative bathing device 50 is still easily fabricated by molded plastic methods. All remaining components of the alternative bathing device 50 remain substantially the same as those noted in the discussion of the bathing device 10 illustrated in FIGS. 1 through 3a.

It should be understood that the preferred embodiments mentioned here are merely illustrative of the present invention. Numerous variations in design and use of the present invention may be contemplated in view of the following claims without straying from the intended scope and field of the invention herein disclosed.

I claim:

1. An animal-containment device comprising:
 a) a basin;
 b) animal-restraining means for restraining an animal within said basin; and
 c) a raised hump formed integrally with said basin and centrally located in said basin, said hump generally conforming to an underbelly shape of said animal so that said animal is prevented from sitting or lying down.

2. The animal-containment device as claimed in claim 1, said animal-restraining means comprising:
 a) at least one strap means, said strap means being able to be placed over a back of an animal,
 b) a collar-restraining means for attachment to a collar of said animal,
 wherein said basin includes a first end and a second end, two sides, and a bottom.

3. The animal-containment device as claimed in claim 2 wherein said strap means includes one or more back-straps, said collar-restraining means includes a collar-restraining strap and a collar-restraining clip, said animal-containment device further comprising:
 a) a pair of elongated slots, each one of said slots being located within one of said two sides, wherein at least one of said one or more back-straps is located in at least one of said elongated slots so that said one or more back-straps is horizontally slidable therewithin, and
 b) an end-slot located within said first end, wherein said collar-restraining strap is adjustably secured through said end-slot and said collar-restraining clip is attachable to a standard animal collar,
 wherein said animal is securely held above said hump by said collar-restraining clip and said one or more back-straps during animal care.

4. The animal-containment device as claimed in claim 3 wherein said animal care is bathing and said second end includes a drain means for selectively draining bath-water from said basin.

5. The animal-containment device as claimed in claim 4 wherein said drain means includes a plug means for controlling bath-water flow and a threaded section for receiving a threaded end of a standard garden hose.

6. The animal-containment device as claimed in claim 5 wherein said plug means is selected from a group consisting of sliding valves, rotating valves, spigots, rubber stoppers, screw-in plugs, and plastic caps.

7. The animal-containment device as claimed in claim 6 wherein said one or more back-straps and said collar-restraining strap are made from a flexible, durable and water-proof material.

8. The animal-containment device as claimed in claim 5 wherein said drain means is formed integrally with said basin and said plug means is selected from a group consisting of sliding valves, rotating valves, spigots, rubber stoppers, screw-in plugs, and plastic caps.

9. The animal-containment device as claimed in claim 7 wherein said one or more back-straps and said collar-restraining strap are made from a flexible, durable and water-proof material and said collar-restraining clip is a spring-loaded swivel clip.

10. A containment device for use with an animal, said device comprising:
 a) a one-piece basin having a first end and a second end, two sides, and a bottom;
 b) a pair of elongated slots, each one of said slots being located within one of said sides;
 c) one or more back-straps located in at least one of said slots so that each of said one or more back-straps is horizontally slidable within said elongated slot;
 d) an end-slot located within said first end;
 e) a collar-restraining means for attachment to a collar of an animal, said collar-restraining means adjustably secured through said end-slot; and
 f) a raised hump formed integrally with said basin and centrally located on said bottom.

11. The device as claimed in claim 10 wherein said device is used for animal bathing and said collar-restraining means includes a restraint strap and a swivel clip, said restraint strap being adjustable in length and located between said swivel clip and said end-slot.

12. The device as claimed in claim 11 wherein said second end includes:
 a) a drain having a threaded section for receiving a threaded end of a standard garden hose;
 b) a drain plug for selectively draining bath-water from said basin; and
 c) a rear cut-out portion providing a rear lowered rim section of said basin so that said animal may be walked into or backed out of said basin.

13. The device as claimed in claim 12 wherein said first end includes a front cut-out portion providing a front lowered rim section of said basin so that said animal may be walked into said basin through said rear lowered rim section and out of said basin through said front lowered rim section.

14. The device as claimed in claim 13 wherein said drain plug is selected from a group consisting of sliding valves, rotating valves, spigots, rubber stoppers, screw-in plugs, and plastic caps.

15. The device as claimed in claim 13 wherein said drain is formed integrally with said basin and said plug is selected from a group consisting of sliding valves, rotating valves, spigots, rubber stoppers, screw-in plugs, and plastic caps.

16. The device as claimed in claim 13 wherein
 said one or more back-straps and said collar strap are made from a flexible, durable and water-proof material,
 said one or more back-straps includes a quick release fastening means for securing said one or more back-straps substantially tightly against a back of said animal, and
 said collar strap includes an adjustment-clip through which said collar strap is looped to hold said collar strap at varying lengths.

17. A containment device for bathing-related use with an animal, said containment device comprising:

a) a one piece basin having two ends, two sides, and a bottom;

b) a pair of elongated slots, each one of said slots being located within one of said sides;

c) at least one back-strap located in at least one of said slots so that said back-strap is horizontally slidable within said elongated slot, said back-strap including a quick release fastening means for securing said back-strap between said two sides and against a back of an animal placed in said basin;

d) an end-slot located within one of said ends;

e) a collar restraint having a restraint strap, a spring-loaded swivel clip attachable to a standard animal collar, said restraint strap adjustably secured through said end-slot via an adjustment-clip;

f) a hump formed with said basin and centrally located on said bottom, said hump substantially conforming to a shape of an underbelly of said animal;

g) a drain having a threaded section for receiving a threaded end of a standard garden hose; and h) a drain plug for selectively draining bath-water from said basin.

18. The containment device as claimed in claim 17 wherein each of said two ends includes a cut-out portion providing a lowered rim section of said basin so that said animal may be walked into said basin through either one of said two ends via said lowered rim sections and out of said basin through the other of said two ends.

* * * * *